United States Patent [19]
Eden

[11] 3,871,464
[45] Mar. 18, 1975

[54] SELF-PROPELLED GOLF BAG CART

[76] Inventor: John W. Eden, 1101 Farquhar Dr., York, Pa. 17403

[22] Filed: Sept. 12, 1973

[21] Appl. No.: 396,347

[52] U.S. Cl. ........ 180/19 S, 280/47.11, 280/DIG. 5
[51] Int. Cl. ............................................ B62d 51/06
[58] Field of Search ............... 180/19 R, 19 S, 19 H; 280/DIG. 5, 47.11

[56] References Cited
UNITED STATES PATENTS

| | | | |
|---|---|---|---|
| 417,109 | 12/1889 | Speck | 280/47.11 |
| 2,812,824 | 11/1957 | Adams | 180/19 S |
| 3,648,795 | 3/1972 | Moulton | 280/DIG. 5 |
| 3,704,758 | 12/1972 | Cropp | 180/19 R |

FOREIGN PATENTS OR APPLICATIONS

| | | | |
|---|---|---|---|
| 480,979 | 2/1952 | Canada | 280/47.11 |

Primary Examiner—David Schonberg
Assistant Examiner—John A. Pekar
Attorney, Agent, or Firm—C. Hercus Just

[57] ABSTRACT

A power driven cart to carry a golf bag and having a pair of transversely spaced rear wheels which are separately powered by electric motors, current being supplied thereto by a pair of storage batteries carried by a low frame at opposite sides thereof to provide stability against tipping. A front wheel centered and forwardly of the frame is steered manually by a rearwardly extending handle having spring means operable to automatically center the wheel for forward movement when the steering handle is released. Variable speed is effected by a control member movably carried upon the handle.

7 Claims, 9 Drawing Figures

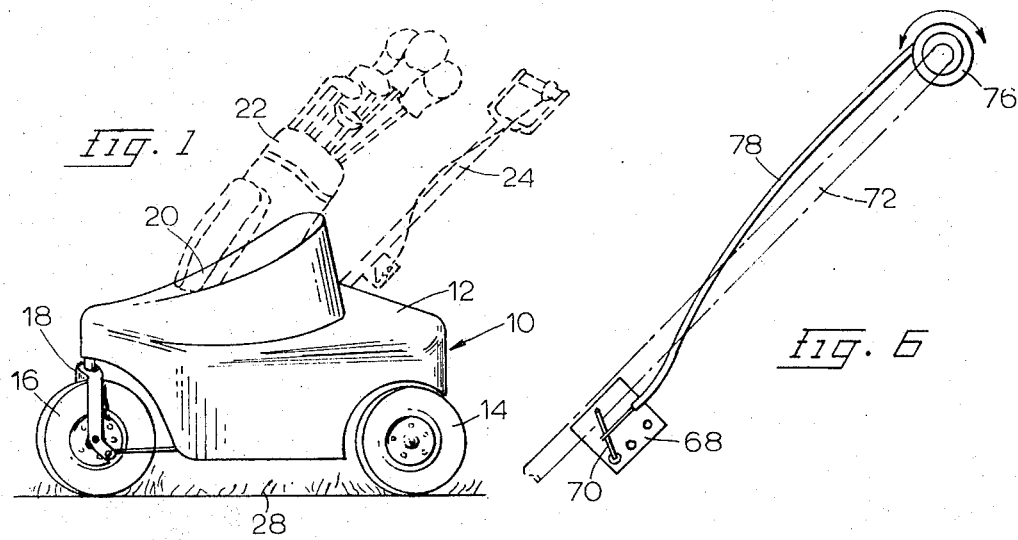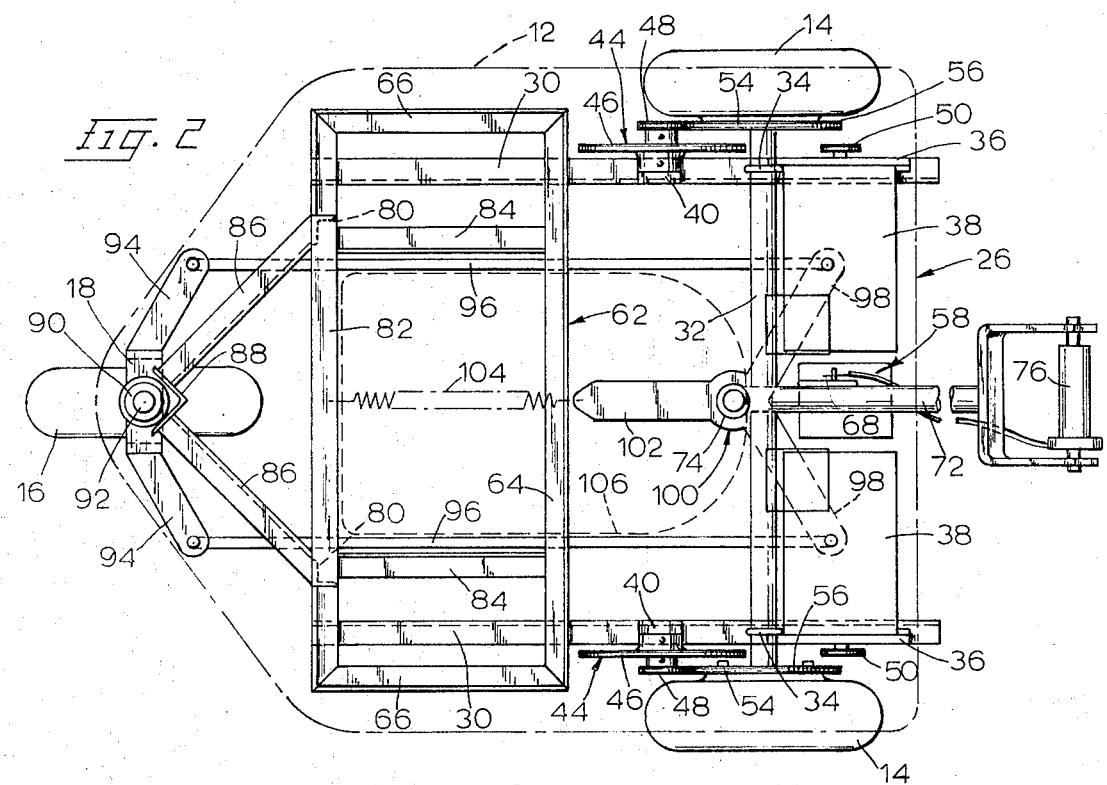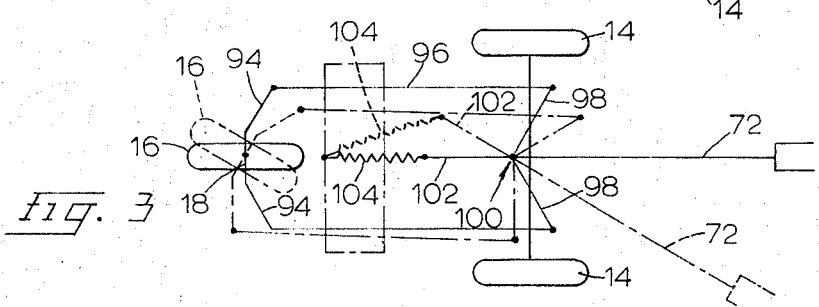

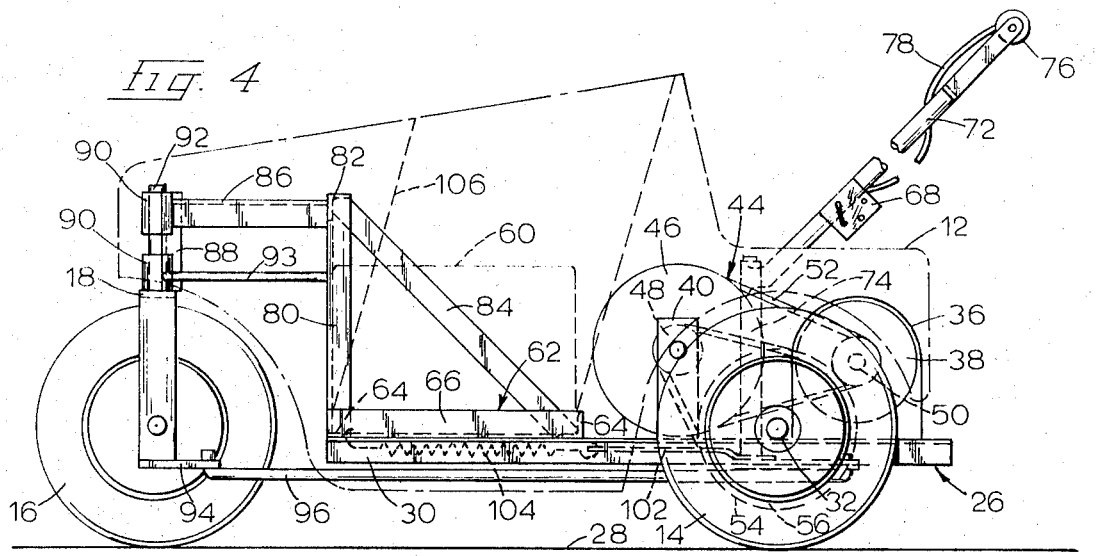
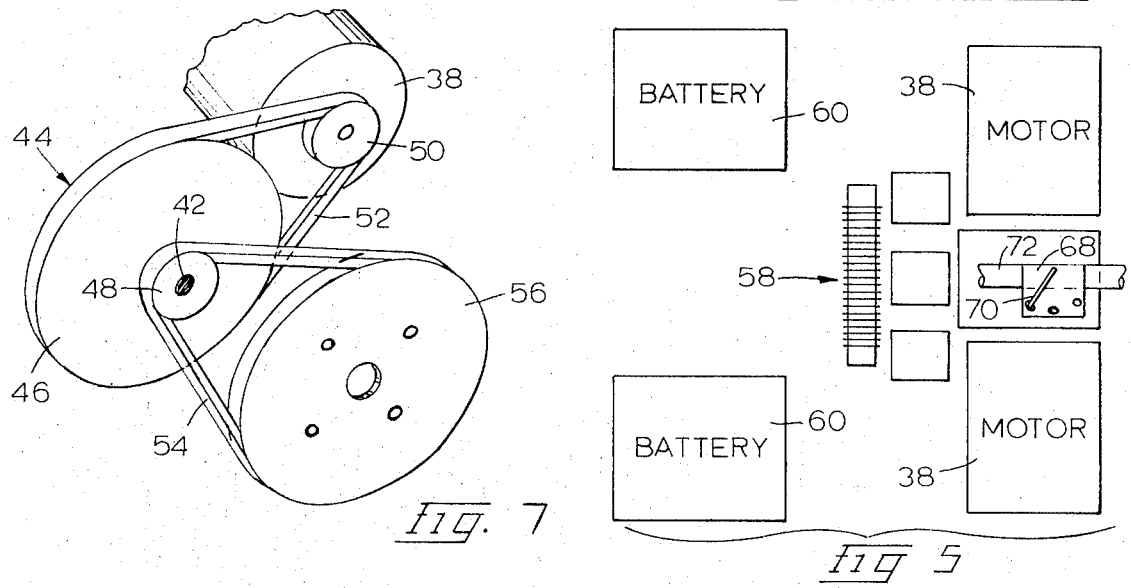
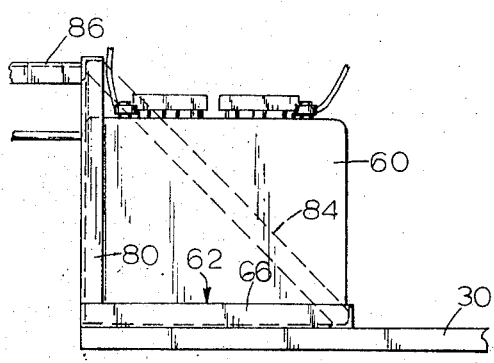
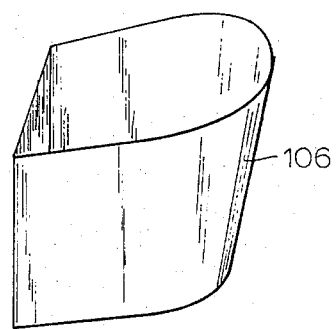

SELF-PROPELLED GOLF BAG CART

BACKGROUND OF THE INVENTION

Various types of self-propelled golf carts have been developed heretofore. In general, they are powered electrically by means of one or more storage batteries which drive an electric motor connected to one of the wheels of the cart for example. Quite a few of such previous carts have been supported by a pair of front wheels, spaced apart transversely, on a frame, and a single rear wheel is pivotally connected to the frame and is adapted to be steered for example by a rearwardly extending handle. An example of this type of cart is shown in prior U.S. Pat. No. 2,812,824, in the name of G. A. Adams, issued Nov. 12, 1957. It has been found that carts of this type are more difficult to steer than those in which a pair of wheels is mounted rearwardly of the frame and a single steerable wheel is movably carried by the forward end of the frame. However, carts in which the latter arrangement is provided also have included forwardly extending handles, whereby the golfer who uses the same must walk in front of the cart at a pace preferably equal to that of the cart. This has been found to be unsatisfactory on a number of occasions and examples of this type of arrangement are shown in prior U.S. Pat. No. 2,962,106, in the name of W. M. Burnside et al, dated Nov. 29, 1970, and No. 3,247,923, to W. D. Cornell, dated Apr. 26, 1966. A golf cart in which the frame is supported rearwardly by a pair of wheels and a forward caster type wheel connected to a pivotal steering member having a rearwardly extending handle is shown in prior U.S. Pat. No. 3,123,173, to C. D. Jacobs, dated Mar. 3, 1964. Such an arrangement does not provide as effective steering as the situation in which the forward wheel is more positively moved for steering purposes than simply relying upon the caster arrangement to take effect.

A somewhat more sophisticated type of cart to carry a golf bag is provided in prior U.S. Pat. No. 3,608,659, to Norman S. Gardner, dated Sept. 28, 1971. The carriage of said cart is supported by four wheels, the rearward pair of which is steered by a rearwardly extending handle but the machanism and components are relatively expensive and complex, thus increasing the cost over that of a more simple golf cart.

Various arrangements of the drive means in the aforementioned patents also leave room for substantial improvement, especially for purposes of utilizing the weight to stabilize the car and prevent tilting laterally. Hence, the present invention has been developed to provide a relatively simple, highly durable and easily steered cart having means to accommodate even a large sized golf bag, the details, characteristics and advantages thereof being setforth as follows.

SUMMARY OF THE INVENTION

It is the principal object of the present invention to provide a self-powered cart for one or more golf bags which includes a simple frame having a pair of wheels adjacent the rearward end thereof and transversely spaced apart an appreciable distance to provide stability against tilting, said stability being augmented by the fact that the wheels are separately powered by individual electric motors mounted on the frame adjacent said wheels and transversely spaced apart, said motors preferably being powered individually and respectively by a pair of storage batteries of appreciable power and weight which are mounted at relatively widely spaced locations adjacent opposite sides of the frame and on the lowest portion thereof, whereby an overall low center of gravity is provided to resist tilting.

It is another object of the invention to steer the front wheel by mounting the same in a yoke or fork, the upper end of which is mounted in a substantially vertical bearing carried by the frame, and laterally extending arm means are connected to the yoke to enable the same to be steered by a rearwardly extending handle connected to a downwardly extending operating stem which has a lateral extension thereon and a link extends between the outer end of said lateral extension and the outer end of the lateral arm on the yoke, thereby providing effective steering means.

It is a further object of the invention ancillary to the foregoing object to provide preferably a pair of laterally extending arms projecting in opposite directions from the lower ends of the legs of said yoke or fork, and the downwardly extending stem disposed adjacent the rearward end of the frame also has a pair of lateral extensions, the outer ends of which are connected to the outer ends of the laterally extending arms on the yoke by pairs of links extending longitudinally along the lower portion of the frame of the cart so as to be protected by the frame and not interfere with any of other mechanism of the cart.

Still another object of the invention is to provide self-centering means for steering mechanism so that when a golfer has set the cart in motion and has manipulated the steering mechanism to direct the cart in a desired direction, the steering handle then may be released while the golfer walks behind the cart and the cart automatically continues its forward motion, the centering means being quite simple and preferably comprising a coiled tension spring or equivalent means extending between the outer end of a centering arm connected to the lower end of the downwardly extending stem of the steering mechanism or spring means or the equivalent connected to the ends of a pair of lateral arms on said stem, said coiled tension springs extending forwardly and the forward end or ends being anchored to appropriate means on the under-side of the frame in a manner to dispose the springs normally under tension, whereby turning of the forward wheel in steering direction places such springs under increased tension capable of restoring the forward wheel to a forward direction when the handle is released by the golfer.

A still further object of the invention is to provide speed control means operated by a member movably carried by the rearwardly extending handle.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a perspective view of a cart embodying the principles of the present invention as seen substantially from one side thereof.

FIG. 2 is a top plan view of the cart shown in FIG. 1 with the enclosing shroud and bag compartment removed to disclose details of the frame and power means for the cart.

FIG. 3 is a schematic view showing, in full lines, principles of the steering mechanism when the forward wheel is positioned for forward movement, and in phantom, the forward wheel and the steering mechanism is shown to illustrate the function of the centering spring in relation to the steering mechanism.

FIG. 4 is a side elevation of the details of the cart shown in FIG. 2 and illustrating in phantom outline the shroud shown in exemplary manner in FIG. 1.

FIG. 5 is a diagrammatic plan layout of the power unit for the golf cart including some of the control mechanism therefore.

FIG. 6 is a fragmentary and somewhat schematic side elevation of a part of the speed control mechanism associated with the power units illustrated in FIG. 5.

FIG. 7 is a perspective exemplary schematic view of a portion of the drive mechanism between the motor and the rear wheel adjacent one side of the frame, a similar system being utilized at the opposite side of the frame.

FIG. 8 is a fragmentary side elevation of a portion of the frame shown in FIG. 4 and illustrating the manner in whicn one of the batteries is supported thereby adjacent one side of the frame to provide stability therefor.

FIG. 9 is a perspective view of an exemplary compartment which is supported by the frame of the cart between the pair of batteries for purposes of receiving a golf bag, the upper edge of said compartment being connected to a rim portion of the shroud shown in FIG. 1.

DETAILED DESCRIPTION

Referring to the drawings, attention is directed to FIG. 1 in which the cart 10 includes a shroud 12 which, for aesthetic purposes, covers the frame and power means for the cart by which the rear wheels 14 are driven, only one of said wheels being shown in FIG. 1. The cart is steered by a single front wheel 16 rotatably supported between legs of a yoke or fork 18. The central portion of the shroud extends upwardly and has an opening 20 therein into which at least one golf bag 22 is inserted. Steering of the front wheel 16 is effected by a rearwardly extending handle 24.

Referring to FIGS. 2 and 3, the cart comprises a main frame 26 which, as can be seen especially from FIG. 4, preferably is spaced only a few inches above the supporting surface such as the ground line 28. As shown in FIG. 2, the main frame comprises a pair of side members 30, which for convenience may comprise angles or channels. A rear axle 32 extends between and beyond the side members 30, said axle being fixedly connected thereto by appropriate means such as U-bolts 34. The rear wheels 14 are mounted upon the opposite ends of the rear axle 32 by a suitable bearing of conventional type. Extending upward from the rear portion of each of the side members 30 is a motor mounting plate 36. An electric motor 38 of suitable horsepower rating is connected firmly at one end to each of the plates 36. Also extending upward from each of the side members 30, intermediately of the ends thereof, is a pulley mounting plate 40. An appropriate shaft 42 projects outwardly from the upper end portions of each of the pulley mounting plates 40 for purposes of rotatably supporting a compound pulley or sprocket gear 44, as desired, for the following purposes.

The compound pulleys or sprocket gears 44 each comprise a large diameter pulley or sprocket gear 46 which is fixed to and co-axial with a small diameter pulley or sprocket gear 48. Each of the motors is provided with a driving pulley or sprocket gear 50 and a belt or sprocket chain 52 extends around the motor pulley or sprocket gear 50 and the large diameter pulley or sprocket gear 46. Also, another belt or sprocket chain 54 extends around the small diameter pulleys or sprocket gears 28 and a large diameter pulley or sprocket gear 56 which is bolted or otherwise fixedly secured to the inner surfaces of each of the rear wheels 14. The above described arrangement of pulleys or sprocket gears and belts or sprocket chains comprise an effective speed reducing assembly between the motors 38 and the rear wheels 14.

The motors 38 preferably are driven simultaneously at similar speeds and thereby provide corresponding similar speeds for the rear wheels 14 which propel the cart forwardly. It also is to be understood that if desired, the motors 38 may be of the reversible type so that it will be possible to move the cart rearwardly, if desired, but under either circumstance, the motors 38 move uni-directionally and simultaneously. Further speed control for the motors 38 also is provided in the form of an electrical rheostat assembly 58 which is shown in outline manner in FIG. 2 and also diagrammatically in FIG. 5. Said rheostat assembly is connected electrically between a pair of storage batteries 60 which respectively are supported at opposite ends of the transversely extending, rectangular battery frame 62 which comprises a pair of elongated transversely extending members 64, which may be angles or channels, the outer ends of which are connected by shorter, longitudinally extending members 66. Any suitable type of clamping means may be employed, as desired, to secure the batteries 60 respectively in the opposite ends of the rectangular frame 62.

The rheostat assembly 58 is disposed electrically between the batteries 60 and the electric motors 38. The preferred speed control provided by the rheostat assembly is achieved by the use of a switch unit 68 which includes a pivoted arm 70 having a contact on the outer end thereof engageable with a series of contacts on the switch 68 as shown in FIG. 5. The same is also shown in FIGS. 4 and 6, in which it will be seen that the switch unit 68 preferably is carried, for example, by an upwardly and rearwardly extending handle 72 which is connected to and extends from the upper end of a substantially vertical steering shaft or stem 74 which is supported in appropriate bearings carried by the main frame 26 intermediately of the sides thereof.

At the upper end of the handle 72, a suitable hand grip 76 is mounted which may be oscillated about a horizontal axis, for example, for purposes of manipulating a motion-transmitting member 78, such as a flexible Bowden wire which extends between the grip 76 and the arm 70 of the switch unit 68 as best shown in FIG. 6. By moving the hand grip 76 in an appropriate direction, the pivoted arm 70 of switch unit 60 is brought into engagement with a desired switch tap of the switch unit 68 by means of which a desired section of the rheostat assembly 58 is connected in the circuit between the motors 38 and the batteries 60 to correspond to a desired speed represented by the switch tap engaged by the pivoted arm 70. Each switch tap represents a different speed and it has been found that only a limited number of such taps is necessary to provide a convenient range of different speeds but, if desired, a more sophiscated type of rheostat or equivalent unit may be employed in which a much more extensive range of different speeds is made available for propelling the rear wheels 14 of the cart. Also, the speed control mechanism may be of such nature as to effect rearward movement of the wheels 14 as well as forward movement, within the spirit of the present invention.

For purposes of supporting the yoke 18 for the front wheel 16 at the forward end of the main frame 26, a pair of vertical frame members 80, which may be angles, for example, are connected at the lower ends thereof to the forward transverse member 64 of the battery frame 62, for example, such as by welding, and a horizontal frame member 82 extends between and is connected to the upper ends of the vertical frame members 80 as best shown in FIGS. 2 and 4. The frame members 80 also are braced by diagonal brace members 84. Extending forwardly from the upper ends of the vertical frame members 80 and toward each other are a pair of horizontal frame members 86, such as angle members, which are connected to members 80 by welding and the forward ends thereof are connected to a suitable vertical member 88, such as by welding. The member 88 is connected to and supports a pair of vertical bearings 90 within which the upper shaft 92 of the yoke or fork 18 is mounted for rotation about a vertical axis. An additional horizontal brace 93 also is used.

Extending laterally outward and preferably slightly rearwardly from the lower ends of the legs of the yoke or fork 18 are a pair of similar arms 94, the level of which preferably is slightly below the main frame 26, as can be seen from FIG. 4. Extending rearwardly from the outer ends of each of the arms 94 is a longitudinal link or rod 96, the rearward ends thereof respectively being pivotally connected to the outer ends of laterally outward and slightly rearwardly extending arms 98 of a spider 100 which is connected to the lower end of the steering shaft 74. The spider 100 also comprises a normally forwardly extending centering arm 102 to which the rearward end of a coiled tension spring 104 is connected and the forward end thereof is connected, for example, intermediately between the ends of the forward transverse member 64 of the battery frame 62, as shown in FIG. 2.

As can be seen particularly from FIGS. 2 and 3 and particularly the latter FIG. 3 which is diagrammatic, when the rearwardly extending steering handle 72 is disposed substantially in line with the longitudinal axis of the cart, the arms and linkages shown in full line are arranged to direct the front wheel 16 forwardly. Even when the steering handle 72 is released but the motors 38 are set to operate at a predetermined speed, the cart will be moved forwardly in a substantially straight line due to the centering affect provided by the spring 104. Also, when the steering handle 72 is moved angularly to one side, as shown in phantom in FIG. 3, the various arms and links will be disposed in the phantom positions thereof and, in particular, the centering arm 102 will be moved in a direction to extend the length of the centering spring 104 and move it from its original longitudinal position shown in FIG. 3. However, after effecting an angular direction of the golf cart by such movement of the steering handle 72, if desired, as soon as the handle is released, the spring 104 will restore the position of the front wheel 16 to move in a forward direction.

Other centering means than those specifically shown may be used. For example, a pair of springs may be connected respectively between the arms 98 and fixed means such as member 64 of the bottom frame. Other types of tension or compression means may also be used in lieu of such springs.

It thus will be seen that said arrangement provides substantial comfort to the golfer in that it does not require constant holding of the steering handle for example, as is necessary in many types of golf carts, yet the automatic means for maintaining the cart in a forward direction and also restoring the guiding of the same to such forward direction following an angular movement thereof is quite simple and free from the use of mechanism which will require extensive attention or servicing.

The opening 20 provided in the central portion of the shroud 12 is co-extensive with the upper end of a bag compartment 106, a simple perspective illustration of which is shown in FIG. 8. The compartment may be formed from any suitable material such as metal, synthetic resin or otherwise and may be formed from molding or other appropriate means of fabrication. As shown in FIG. 2, in which the location of the compartment 106 upon the main frame 26 is shown in outline by a broken line, it will be seen that the same is centrally disposed within the cart so as to minimize the possibility of even a heavy bag of golf clubs tilting the cart laterally or otherwise. Further, the compartment 106 is very appropriately located between the pair of batteries 60 which are spaced transversely approximately in the position shown in FIG. 5 and also as can be visualized from FIG. 2 in which the batteries are disposed between the short frame member 66 and the diagonal brace members 84. From the latter, it also can be visualized that such positioning of the batteries, when considering the weight thereof, affords a very substantial factor of stability to resist tilting and particularly lateral tilting of the cart during operation thereof. Further, from FIG. 4 especially, it will be seen that the batteries are mounted directly upon the main frame 26 which is spaced only a few inches above the supporting ground line 28 for example, whereby the overall center of gravity of the cart is very low. Any suitable means may be used to secure the compartment to the main frame 26.

From the foregoing, it will be seen that the present invention provides a stable cart for purposes of transporting one or more golf bags, depending upon the size employed in making the compartment 106, the center of gravity of the cart being low and the distribution of weight being such as to effect such stability. Simple but effective drive means for the transversely spaced rear wheel of the cart also are provided, separate motors preferably being connected to the rear wheels and the same are individualy energized by separate batteries. The front wheel of the cart is steered by simple but effective arms and links controlled by a rearwardly extending, manually operable handle, the same also including the actuating means by which the speed of the motors is conveniently effected. Further, and very importantly, automatically operable centering means for the steering mechanism are provided whereby after an angular movement of the cart has been effected, the front wheel automatically is restored to a position to guide the cart forwardly in a substantially straight line and maintain the direction of movement therein.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A power driven cart to carry a golf bag and steered manually by a person walking rearwardly of said cart, said cart comprising in combination, a frame having means to support a golf bag, a pair of wheels rotatably connected to the rear portion of the frame at opposite sides thereof, power means carried by said frame and interconnected to said wheels to drive the same unidirectionally, yoke means supported by the forward end of said frame within a substantially vertical bearing, a steering wheel supported by said yoke, a steering arm pivotally supported by said frame adjacent the rearward end thereof and having a manually engageable handle extending rearwardly therefrom, linkage means connected between said yoke and said steering arm to effect turning of said front wheel by movement of said rearwardly extending steering arm; and steering control means connected to said steering arm and comprising a centering arm extending outwardly relative to the pivot for said steering arm, and spring means connected to said frame and engaging said centering arm to bias the same in a direction to direct said steering wheel in a forward direction when said manually engageable handle is released, said spring means being placed under increased tension when said steering wheel is turned from a forward direction, whereby said increased tension causes said spring to move said centering arm and steering wheel as aforesaid.

2. The cart according to claim 1 in which said handle is connected to the upper end of a substantially vertical shaft supported for limited rotation about its axis adjacent the rearward portion of said frame, said centering arm and steering arm being connected to the lower end of said shaft.

3. The cart according to claim 2 in which said centering arm extends toward the forward end of said frame when said front wheel extends forwardly, said spring means comprising an elongated coiled tension spring connected at one end to the forward end of said centering arm, and anchoring means connected to said frame adjacent the forward portion thereof and the opposite end of said spring being connected thereto under limited tension.

4. The cart according to claim 3 in which pairs of lateral arms are connected respectively to said yoke and the lower end of said vertical shaft adjacent the rearward end of said frame, the arms of said pairs thereof respectively extending laterally in opposite directions, said linkgage comprising a pair of links extending longitudinally of said frame and spaced transversely relative to said frame, and means connecting the opposite ends of said links respectively to the ends of the laterally extending arms of said pairs thereof.

5. The cart according to claim 1 in which said wheels at the rearward portion of said frame are spaced apart a substantial distance and said power means comprises a pair of electric motors supported by said frame respectively adjacent said wheels, means connecting said motors respectively to said wheels, a pair of electric batteries carried in side-by-side relationship by the lowest portion of said frame intermediately of the front and rear ends thereof, and spaced apart to dispose the same adjacent the outer side edges of said frame, whereby the weight and location of said batteries and motors upon said frame affords substantial stability to said cart to resist tilting laterally.

6. The cart according to claim 5 in which speed control means for said motors are connected to said cart, said handle on said steering arm supporting actuating means for said speed control means rotatable about the axes of said handle, and said speed control means comprising a rheostat, a movable arm operable relative to said rheostat to establish selected resistances respectively proportional to a plurality of different speeds, and means connecting said rotatable actuating means on said handle to said movable arm to actuate the same.

7. The cart according to claim 5 in which the space between said batteries is substantially centrally of said frame, and a compartment open at the top positioned within said space adapted to receive a golf bag and support the same upon said cart.

* * * * *